(No Model.)

N. W. PRATT.
SURFACE BLOW FOR STEAM GENERATORS.

No. 323,884. Patented Aug. 4, 1885.

WITNESSES:

INVENTOR

Nathaniel W. Pratt

BY

Charles W. Fowler
ATTORNEY

UNITED STATES PATENT OFFICE.

NATHANIEL W. PRATT, OF BROOKLYN, ASSIGNOR TO THE BABCOCK & WILCOX COMPANY, OF NEW YORK, N. Y.

SURFACE-BLOW FOR STEAM-GENERATORS.

SPECIFICAION forming part of Letters Patent No. 323,884, dated August 4, 1885.

Application filed March 27 1885. (No model.)

*To all whom it may concern:*

Be it known that I, NATHANIEL W. PRATT, a citizen of the United States, residing at Brooklyn, in the county of Kings and State of New York, have invented a new and useful Improvement in Surface-Blow for Steam-Generators, of which the following is a specification, reference being had to the accompanying drawings, in which—

Figure 1:
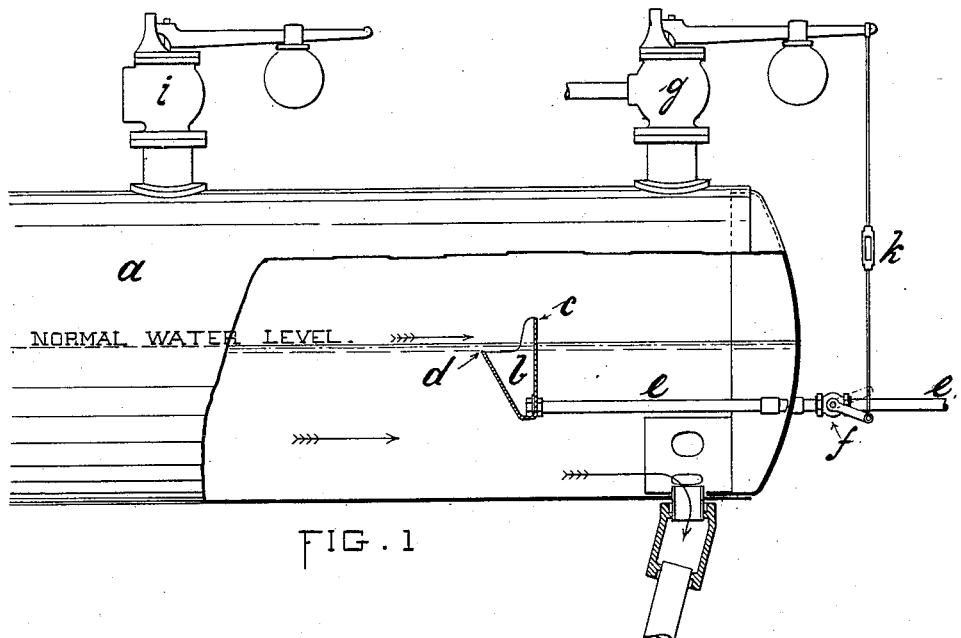
Figure 2:
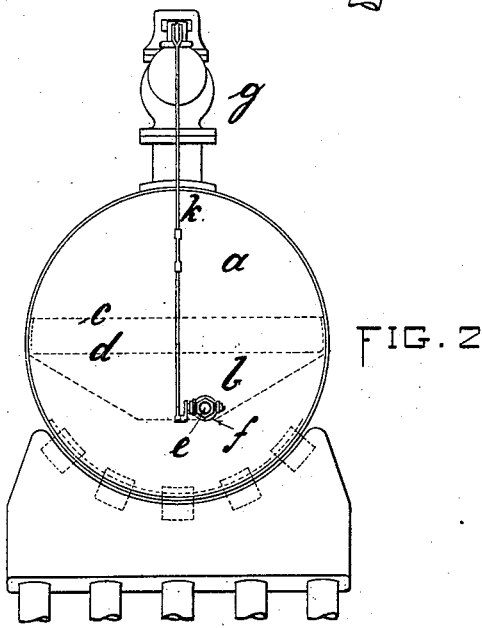

Figure 1 is a side view, partly in section and Fig. 2 an end view, of a steam-generator illustrating my invention.

The invention consists in arranging a pan or receptacle within the boiler near the surface of the normal water-level in a manner to collect the foreign matter or impurities that are thrown to the surface of the water by the application of heat, which are subsequently removed through a connected blow-off pipe from the bottom of said pan, having a discharge cock or valve that may be operated at the will of the attendant, or automatically, by means of a connected safety-valve, all as hereinafter particularly referred to.

In the drawings, $a$ represents the shell of a boiler, partly broken away in Fig. 1 to show a portion of its interior, and the arrangement of parts of the invention.

$b$ is a pan or receptacle extending the entire width of the boiler, as shown in dotted lines, Fig. 2, open at the top, and placed with its front edge, $d$, about one inch below the normal water-level of the boiler, and in its rear edge, $c$, projecting above said level, substantially as shown.

$e$ represents a blow-off pipe leading from the bottom of the pan outward, and provided with a valve, $f$, that may be operated by hand, or by means of a rod-connection, $k$, attached to the working-lever of a safety-valve, $g$, or similar device—for example, a weighted diaphragm.

The pan or receptacle $b$ is arranged with its lowest or submerged edge, $d$, toward the flow of the water-current, the direction of the latter being indicated by the arrows, Fig. 1, and its rear edge, $c$, that projects above the water-level, deflects the surface-water into the pan, so that when the valve $f$ is opened, all the surface-water and its contained impurities above the front edge, $d$, of the pan are drawn off, the valve $f$ being closed when steam is discharged at the end of the pipe $e$, which indicates a fall in the water-level to that point.

In operating the valve $f$ automatically by a connection with the working-lever of the safety-valve, as referred to, the valve will be opened whenever the pressure in the boiler reaches the point at which said valve is adjusted to act.

An independent safety-valve, $i$, may also be provided to regulate the maximum pressure to be carried in the boiler and adjusted to act at a pressure slightly above that at which the valve $g$ is adjusted.

Having thus fully described my invention, what I claim, and desire to secure by Letters Patent, is—

In combination with a surface blow-pan, substantially such as described, a safety-valve adjusted to act at a given pressure and connected to automatically and simultaneously operate the blow-off valve of said pan, for the purpose set forth.

NAT. W. PRATT.

Witnesses:
   C. W. FORBES,
   AUG. CREVELING.